(12) United States Patent
Wasil et al.

(10) Patent No.: US 10,876,459 B1
(45) Date of Patent: Dec. 29, 2020

(54) EXHAUST SYSTEM FOR A MARINE OUTBOARD ENGINE

(71) Applicant: BRP US INC., Sturtevant, WI (US)

(72) Inventors: Jeffrey Wasil, Kenosha, WI (US); George Broughton, Wadsworth, IL (US)

(73) Assignee: BRP US INC., Sturtevant, WI (US)

( * ) Notice: Subject to any disclaimer, the term of this patent is extended or adjusted under 35 U.S.C. 154(b) by 0 days.

(21) Appl. No.: 16/263,442

(22) Filed: Jan. 31, 2019

Related U.S. Application Data

(60) Provisional application No. 62/624,451, filed on Jan. 31, 2018.

(51) Int. Cl.
| | |
|---|---|
| *F01N 13/00* | (2010.01) |
| *F01N 3/04* | (2006.01) |
| *F01N 3/28* | (2006.01) |
| *B63H 20/24* | (2006.01) |
| *B63H 20/32* | (2006.01) |
| *F01N 11/00* | (2006.01) |

(52) U.S. Cl.
CPC ......... *F01N 13/004* (2013.01); *B63H 20/245* (2013.01); *B63H 20/32* (2013.01); *F01N 3/046* (2013.01); *F01N 3/28* (2013.01); *F01N 11/00* (2013.01); *F01N 2560/08* (2013.01)

(58) Field of Classification Search
CPC ..... F01N 3/00; F01N 3/04; F01N 3/10; F01N 3/28; F01N 13/00; F01N 13/10; F01N 13/004; F01N 3/046; F01N 11/00; F01N 2560/08; B63H 20/00; B63H 20/24; B63H 20/245; B63H 21/00; B63H 21/32; B63H 20/32

USPC ................. 440/89 H, 89 R, 84; 60/288, 299
See application file for complete search history.

(56) References Cited

U.S. PATENT DOCUMENTS

| | | | |
|---|---|---|---|
| 5,239,825 A | 8/1993 | Shibata | |
| 5,346,417 A | 9/1994 | Isogawa | |
| 5,378,180 A * | 1/1995 | Nakayama | ................ F01N 3/28 |
| | | | 440/89 H |
| 5,439,651 A | 8/1995 | Kato | |
| 5,546,748 A | 8/1996 | Iwai et al. | |
| 5,554,060 A | 9/1996 | Koishikawa et al. | |
| 5,562,510 A | 10/1996 | Suzuki et al. | |
| 5,575,699 A | 11/1996 | Isogawa et al. | |
| 5,595,516 A | 1/1997 | Matsumoto et al. | |
| 5,730,632 A | 3/1998 | Murata et al. | |
| 5,743,774 A | 4/1998 | Adachi et al. | |

(Continued)

*Primary Examiner* — Lars A Olson
(74) *Attorney, Agent, or Firm* — BCF LLP

(57) ABSTRACT

An exhaust system for a marine outboard engine including an engine having an engine exhaust port. The exhaust system includes a first exhaust port, a second exhaust port vertically higher than the first exhaust port, a first passage for fluidly connecting to the engine exhaust port and fluidly connected to the first exhaust port, a second passage fluidly connected between the first passage and the second exhaust port, a catalytic converter defining at least in part the second passage, a valve operable to at least partially close the first passage to respectively reduce and increase flow of exhaust gas to the first exhaust port and the second exhaust port, a valve actuator operatively connected to the valve, and a controller operatively connected to the valve actuator for controlling a position of the valve based at least in part on a speed and a throttle request of the engine.

22 Claims, 15 Drawing Sheets

(56) References Cited

U.S. PATENT DOCUMENTS

| | | | |
|---|---|---|---|
| 5,809,776 A * | 9/1998 | Holtermann | F01N 3/2803 |
| | | | 60/288 |
| 5,822,985 A | 10/1998 | Yoshimura | |
| 5,855,495 A | 1/1999 | Kubo | |
| 5,911,608 A | 6/1999 | Nakayama et al. | |
| 6,053,785 A | 4/2000 | Kato et al. | |
| 6,116,022 A | 9/2000 | Woodward | |
| RE36,888 E | 10/2000 | Sougawa et al. | |
| RE37,230 E | 6/2001 | Schlunke et al. | |
| 6,632,110 B2 | 10/2003 | Kato | |
| 6,662,555 B1 | 12/2003 | Ishii | |
| 6,729,921 B1 | 5/2004 | Ishii | |
| 6,884,133 B2 | 4/2005 | Ishii | |
| 7,552,586 B1 | 6/2009 | White | |
| 7,867,048 B2 | 1/2011 | Ochiai | |
| 7,954,314 B1 | 6/2011 | Bruestle et al. | |
| 8,011,985 B2 | 9/2011 | Ochiai | |
| 8,118,631 B2 | 2/2012 | Ochiai | |
| 8,142,247 B2 | 3/2012 | Konakawa et al. | |
| 8,298,026 B2 | 10/2012 | Ochiai | |
| 8,366,501 B2 | 2/2013 | Kazuta | |
| 8,469,754 B1 | 6/2013 | Maekawa et al. | |
| 8,585,452 B1 | 11/2013 | Maekawa et al. | |
| 8,668,538 B1 | 3/2014 | Langenfeld et al. | |
| 8,764,501 B1 | 7/2014 | Maekawa et al. | |
| 8,795,013 B1 | 8/2014 | Nakayama et al. | |
| 8,944,870 B1 | 2/2015 | Ochiai et al. | |
| 8,986,058 B2 | 3/2015 | Saruwatari et al. | |
| 9,174,818 B1 | 11/2015 | Langenfeld et al. | |
| 9,260,172 B2 | 2/2016 | Ochiai | |
| 9,359,058 B1 | 6/2016 | Langenfeld et al. | |
| 9,365,275 B1 | 6/2016 | Habeck et al. | |
| 10,442,515 B1 * | 10/2019 | Wasil | B63H 20/245 |

\* cited by examiner

EXHAUST SYSTEM FOR A MARINE OUTBOARD ENGINE

CROSS-REFERENCE

The present application claims priority to U.S. Provisional Patent Application No. 62/624,451, filed on Jan. 31, 2018, the entirety of which is incorporated herein by reference.

FIELD OF TECHNOLOGY

The present technology relates to exhaust systems for marine outboard engines.

BACKGROUND

Many watercraft are propelled by one or more outdrives such as outboard engines, stern drives and pod drives for example that are often powered by internal combustion engines.

In order to control the exhaust emissions resulting from the combustion process in internal combustion engines, the exhaust systems of internal combustion engines can include a catalytic converter (sometimes simply referred to as a "catalyst"). The catalytic converter, through chemical reactions, converts some compounds of the exhaust gas to less polluting compounds.

However, integrating a catalytic converter into an outboard engine can be challenging due to the limited space available on outboard engines, the harsh marine environment in which outboard engines operate and increasing exhaust flows of increasingly powerful outboard engines. In addition, combustion parameters of the engine (e.g., fuel injection, spark timing) are typically adjusted at high engine speeds to regulate the temperature of exhaust gas flow to the catalytic converter in order to avoid overheating the catalytic converter. While this is advantageous for the catalytic converter, it may negatively affect combustion efficiency and result in a greater amount of harmful emissions by the engine.

One solution could be to provide larger catalytic converters or multiple catalytic converters. However, the space constraints and the significant cost of catalytic converters make this solution undesirable.

There is therefore a desire for an exhaust system for an outboard engine that alleviates at least in part some of these drawbacks.

SUMMARY

It is an object of the present technology to ameliorate at least some of the inconveniences present in the prior art.

According to one aspect of the present technology, there is provided an exhaust system for a marine outboard engine including an engine. The engine includes an engine exhaust port. The exhaust system includes a first exhaust port; a second exhaust port positioned vertically higher than the first exhaust port; a first passage adapted for fluidly connecting to the engine exhaust port and fluidly connected to the first exhaust port; a second passage fluidly connected between the first passage and the second exhaust port; a catalytic converter defining at least in part the second passage; an exhaust path valve operable to at least partially close the first passage such as to reduce flow of exhaust gas to the first exhaust port and increase flow of exhaust gas to the second exhaust port; a valve actuator operatively connected to the exhaust path valve for actuating the exhaust path valve; and a controller operatively connected to the valve actuator for controlling a position of the exhaust path valve based at least in part on a speed of the engine and a throttle request of the engine.

In some implementations of the present technology, the controller closes the exhaust path valve when the speed of the engine is below a predetermined threshold engine speed and the controller opens the exhaust path valve when the speed of the engine is greater than the predetermined threshold engine speed.

In some implementations of the present technology, below a predetermined throttle request, the predetermined threshold engine speed is a first predetermined threshold engine speed. Above the predetermined throttle request, the predetermined threshold engine speed is a second predetermined threshold engine speed. The first predetermined threshold engine speed is greater than the second predetermined threshold engine speed.

In some implementations of the present technology, the predetermined throttle request is between 55% and 75% of wide-open throttle (WOT) inclusively.

In some implementations of the present technology, the second passage remains open at all positions of the exhaust path valve.

In some implementations of the present technology, the controller controls the position of the exhaust path valve to be one of a fully closed position, a fully open position and one of a plurality of positions between the fully closed and fully open positions.

In some implementations of the present technology, the exhaust system also includes a pressure sensor disposed in one of the first passage and the second passage upstream of the catalytic converter. The controller also controls the position of the exhaust path valve based at least in part on a back pressure sensed by the pressure sensor.

In some implementations of the present technology, the controller controls the position of the exhaust path valve based at least in part on the back pressure for providing a substantially constant engine torque by the engine.

In some implementations of the present technology, the second passage is further defined by a muffler fluidly connected between the catalytic converter and the second exhaust port.

In some implementations of the present technology, at least a majority of the catalytic converter is disposed vertically higher than the muffler.

In some implementations of the present technology, the muffler has a water inlet for receiving water within the muffler to cool exhaust gases flowing through the muffler and a water outlet for expelling water from the muffler.

In some implementations of the present technology, the first passage includes a first conduit. At least part of the first conduit extends along a first direction. The second passage includes a second conduit having: an inlet opening inside the first conduit for receiving incoming exhaust gases into the second conduit; a first leg extending from the inlet in the first direction; and a second leg extending generally perpendicularly from the first leg through a side of the first conduit.

In some implementations of the present technology, the catalytic converter is located vertically higher than the first passage.

In some implementations of the present technology, the exhaust path valve is located downstream of a junction between the first passage and the second passage.

In some implementations of the present technology, the exhaust system also includes a cooling jacket at least partly surrounding the exhaust path valve and a junction between the first passage and the second passage. The cooling jacket includes a water inlet for receiving water into the cooling jacket and a water outlet for expelling water from the cooling jacket.

In some implementations of the present technology, the catalytic converter is a heated catalytic converter.

In some implementations of the present technology, the exhaust path valve is vertically between the first and the second exhaust ports.

In some implementations of the present technology, the first exhaust port is positioned such as to be located below water during operation of the marine outboard engine, and the second exhaust port is positioned such as to be located above water during operation of the marine outboard engine.

According to another aspect of the present technology, there is provided a marine outboard engine for a watercraft. The marine outboard engine includes: an engine having an engine exhaust port for expelling exhaust gas from the engine; a propulsion unit driven by the engine; a throttle body connected to the engine and including a throttle valve for controlling air supplied to the engine; an engine controller controlling a position of the throttle valve in accordance with a throttle request; and an exhaust system. The exhaust system includes: a first exhaust port; a second exhaust port positioned vertically higher than the first exhaust port; a first passage fluidly connected between the engine exhaust port and the first exhaust port; a second passage fluidly connected between the first passage and the second exhaust port; a catalytic converter fluidly defining at least in part the second passage; an exhaust path valve operable to at least partially close the first passage such as to reduce flow of exhaust gas to the first exhaust port and increase flow of exhaust gas to the second exhaust port; and an exhaust path valve actuator operatively connected to the exhaust path valve for actuating the exhaust path valve. The engine controller is operatively connected to the exhaust valve actuator for controlling a position of the exhaust path valve based at least in part on a speed of the engine and the throttle request of the engine.

Explanations and/or definitions of terms provided in the present application take precedence over explanations and/or definitions of these terms that may be found in the document incorporated herein by reference.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
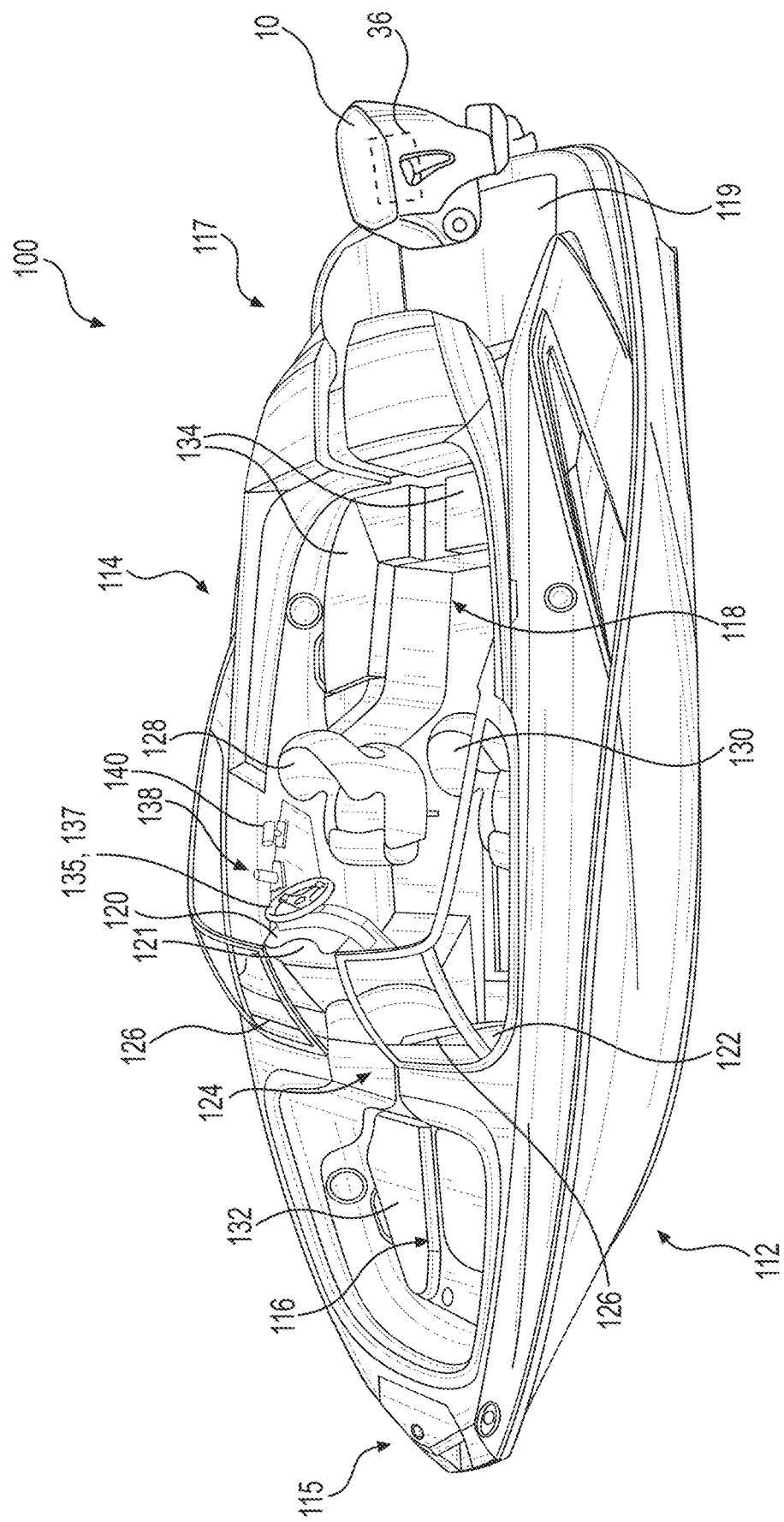
FIG. 1 is a top, left side perspective view of a watercraft.

An example of a watercraft 100 having a marine outboard engine 10 is shown in FIG. 1. It should be understood that the watercraft 100 could have a construction other than the one depicted and described below.

The watercraft 100 has a hull 112 and a deck 114 supported by the hull 112. The watercraft has a front 115 and a rear 117. The deck 114 has a forward passenger area 116 and a rearward passenger area 118. A right console 121 including a dashboard 120 and a left console 122 are disposed on either side of the deck 114 between the two passenger areas 116, 118. A passageway 124 disposed between the two consoles 121, 122 allows for communication between the two passenger areas 116, 118. Windshields 126 are provided over the consoles 121, 122.

An operator seat 128 and a passenger seat 130 are disposed behind the consoles 120 and 122 respectively. Seats 132 and 134 are also provided in the forward and rearward passenger areas 116 and 118 respectively. The watercraft 100 has a steering system 150, including a hydraulic helm 135, for steering the watercraft 100. The console 120 is provided with the hydraulic helm 135. In the present implementation, the hydraulic helm 135 includes a steering wheel 137. In this implementation, an auxiliary steering input device, in the form of a joystick 138, is also provided for steering the watercraft 100 under certain conditions.

The watercraft 100 includes other features not described herein, such as electrical and fuel systems. It should be understood that such features are nonetheless present in the watercraft 100.

Figure 2:
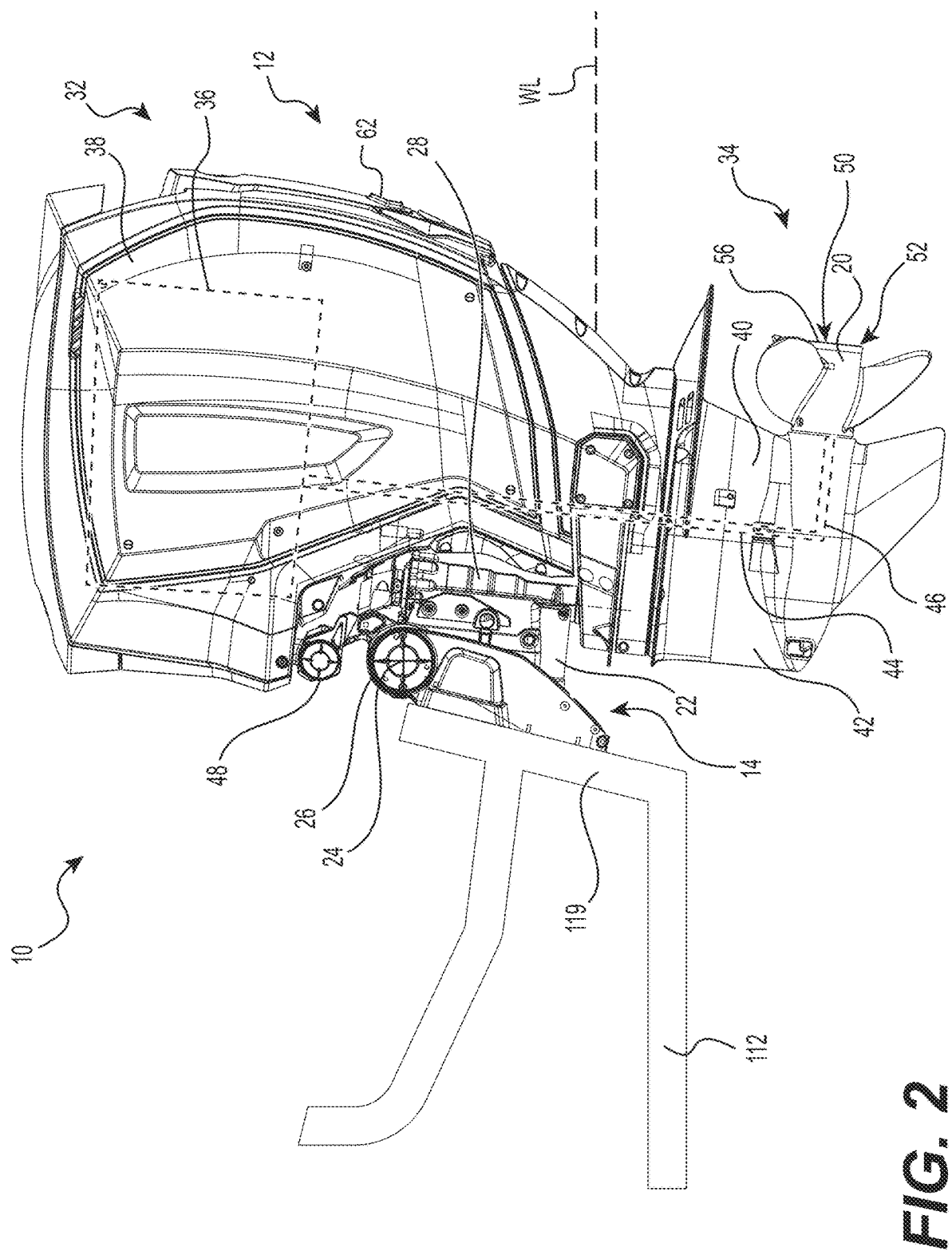
FIG. 2 is a left side elevation view of an outboard engine of the watercraft of FIG. 1.

With reference to FIG. 2, the marine outboard engine 10 includes a drive unit 12 and a bracket assembly 14 supporting the drive unit 12 on a stern 119 of the hull 112 of the watercraft 100. The drive unit 12 can be pivoted about a generally horizontal tilt/trim axis (not shown) relative to the hull 112 and the stern 119. The drive unit 12 is moved about the tilt/trim axis 24 by two linear actuators 22 (only one of which is shown) and by a rotary actuator 26 of the bracket assembly 14. The drive unit 12 can also be steered left or right relative to the hull 112 by a steering rotary actuator 28 of the bracket assembly 14 about a steering axis (not shown) extending generally perpendicularly to the tilt/trim axis 24.

The drive unit 12 includes an upper portion 32 and a lower portion 34. The upper portion 32 includes an internal combustion engine 36 (schematically shown in dotted lines in FIGS. 1 and 2) surrounded and protected by a cowling 38. In this implementation, the engine 36 housed within the cowling 38 is an internal combustion engine, such as a two-stroke or four-stroke engine, having cylinders 25 extending horizontally. It is contemplated that other types of engine could be used and that the cylinders could be oriented differently. The lower portion 34 includes a propulsion unit 40, also known as the gear case assembly, which includes a propeller 20 and a connection portion 42, which extends downwards from the upper portion 32.

Figure 4:
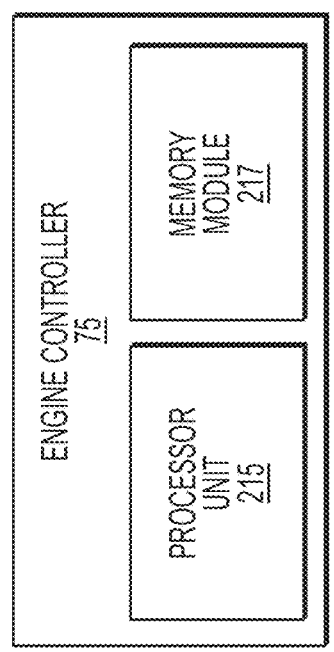
FIG. 4 is a schematic representation of the controller of FIG. 3.
Figure 3:
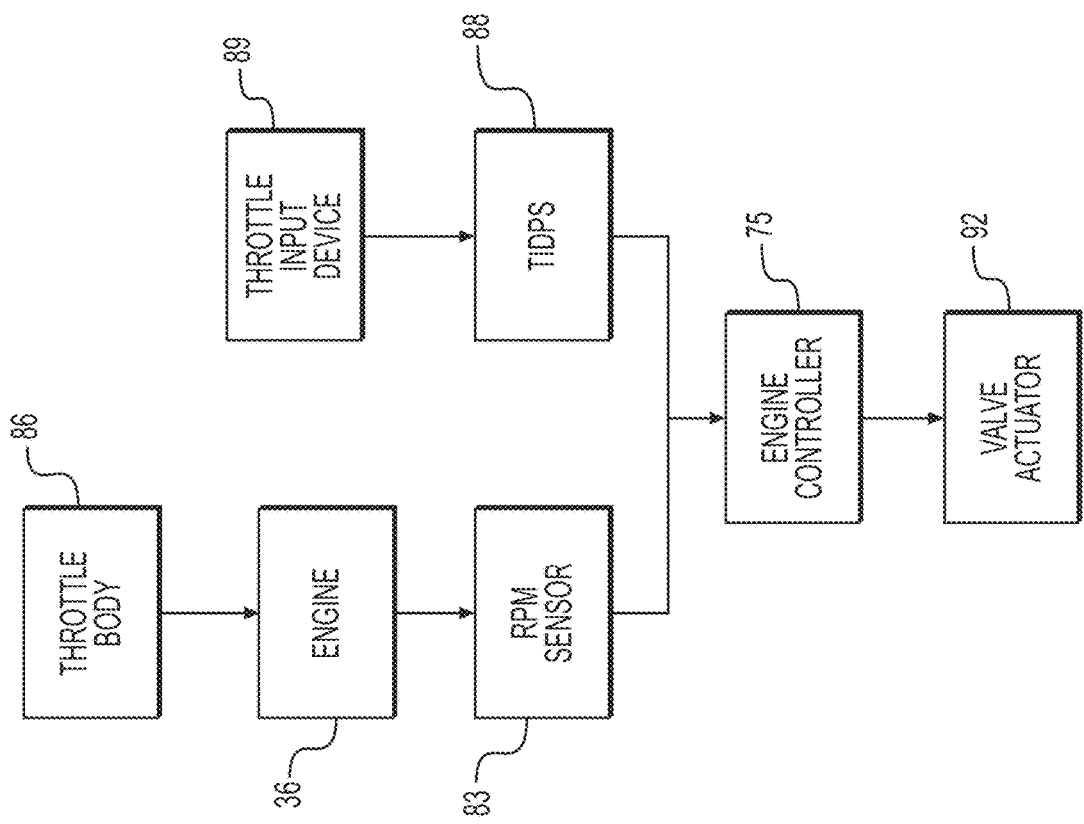
FIG. 3 is a schematic diagram of a controller and associated components used for monitoring parameters of an engine of the outboard engine of FIG. 2 for controlling an exhaust path valve of an exhaust system of the outboard engine.

With reference to FIGS. 3 and 4 operation of the engine 36 is controlled by an engine controller 75, also known as an engine management module. As shown in FIG. 4, the engine controller 75 has a processor unit 215 for carrying out executable code, and a non-transitory memory module 217 that stores the executable code in a non-transitory medium (not shown) included in the memory module 217. The processor unit 215 includes one or more processors for performing processing operations that implement functionality of the engine controller 75. The processor unit 215 may be a general-purpose processor or may be a specific-purpose processor comprising one or more preprogrammed hardware or firmware elements (e.g., application-specific integrated circuits (ASICs), electrically erasable programmable read-only memories (EEPROMs), etc.) or other related elements. The non-transitory medium of the memory module 217 may be a semiconductor memory (e.g., read-only memory (ROM) and/or random-access memory (RAM)), a magnetic storage medium, an optical storage medium, and/or any other suitable type of memory. While the engine controller 75 is represented as being one entity in this implementation, it is understood that the engine controller 75 could comprise separate entities for controlling components separately.

Returning to FIG. 2, the engine 36 is coupled to a driveshaft 44 (schematically shown in dotted lines). The driveshaft 44 is coupled to a transmission (not shown) which is coupled to a propeller shaft 46 on which the propeller 20 is mounted. In the present implementation, the propeller shaft 46 is perpendicular to the driveshaft 44; however it is contemplated that it could be at other angles. The driveshaft 44, the transmission and the propeller shaft 46 transfer the power of the engine 36 to the propeller 20 disposed at the rear of the propulsion unit 40 of the drive unit 12. It is contemplated that the propulsion unit of the outboard engine 10 could alternatively include a jet propulsion device, turbine or other known propelling device.

To facilitate the installation of the outboard engine 10 on the watercraft 100, the outboard engine 10 is provided with a box 48. The box 48 is connected above the rotary actuator 26. It is contemplated that the box 48 could be mounted elsewhere on the bracket assembly 14 or on the drive unit 12. Devices located inside the cowling 38 which need to be connected to other devices disposed externally of the outboard engine 10, such as on the deck or hull 112 of the watercraft 100, are provided with lines which extend inside the box 48. In one implementation, these lines are installed in and routed to the box 48 by the manufacturer of the outboard engine 10 during manufacturing of the outboard engine 10. Similarly, the corresponding devices disposed externally of the outboard engine 10 are also provided with lines that extend inside the box 48 where they are connected with their corresponding lines from the outboard engine 10. It is contemplated that one or more lines could be connected between one or more devices located inside the cowling 38 to one or more devices located externally of the outboard engine 10 and simply pass through the box 48. In such an implementation, the box 48 would reduce movement of the one or more lines when the outboard engine 10 is steered, tilted or trimmed.

Other known components of an engine assembly are included within the cowling 38, such as a starter motor and an alternator. As it is believed that these components would be readily recognized by one of ordinary skill in the art, further explanation and description of these components will not be provided herein.

Figure 12:
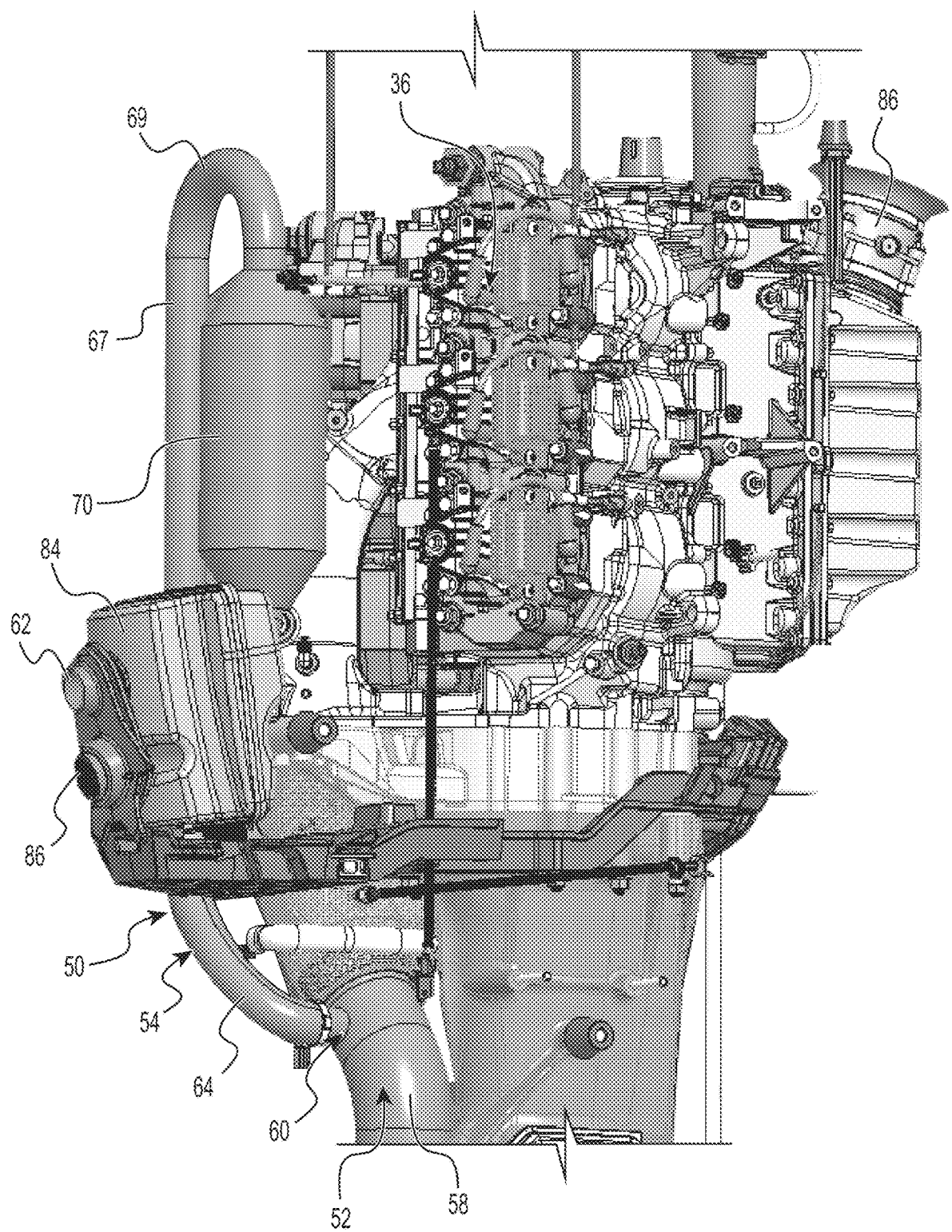
FIG. 12 is a perspective view taken from the rear, right side of the portion of the outboard engine of FIG. 5.

As can be seen in FIGS. 3 and 12, the engine 36 is connected to a throttle body 86. More specifically, the throttle body 86 is connected to an air inlet 29 of an airbox 27 connected to air intake ports (not shown) of the engine 36. The throttle body 86 contains a throttle valve (not shown), the position of which controls the amount of air supplied to the engine 36 for combustion. It is contemplated that the engine 36 could be provided with more than one throttle body 86. In an alternative implementation where the engine 36 is a carbureted engine, the throttle body 86 is in the form of a carburetor which is a type of throttle body through which fuel is also supplied to the engine 36. In the present implementation, the position of the throttle valve in the throttle body 84 is controlled by the engine controller 75. The engine controller 75 receives an input signal from a throttle input device position sensor (TIDPS) 88. The TIDPS 88 senses a position of a throttle input device 89 (e.g., a throttle lever or pedal) disposed in the watercraft 100 and which is actuated by the operator of the watercraft 100. The throttle input device 89 can be actuated through a range of throttle request positions from 0 percent throttle request to 100 percent throttle request. When in operation and the throttle input device 89 is in the 0 percent throttle request position and the throttle valve of the throttle body 86 is in this requested position, the engine 36 is idling. When in operation and the throttle input device 89 is in the 100 percent throttle request position and the throttle valve of the throttle body 86 is in this requested position, the engine 36 is at "wide-open throttle" (WOT).

The watercraft 100 can be operated in forward, neutral and reverse and is provided with a single lever shift-throttle lever (i.e. the throttle input device 89) for controlling throttle request and for switching between forward, neutral and reverse modes of operation. In alternative implementations, the watercraft 100 can be provided with a two distinct levers: one throttle lever that controls throttle request and one shift lever that controls forward/neutral/reverse. Based on the signal received from the TIDPS 88, which reads the position of the throttle input device 89, and other signals received from other sensors of the outboard engine 10, such as an engine speed sensor 83 that senses a speed of the engine 36, the engine controller 75 determines the position that the throttle valve of the throttle body 86 should have and sends a signal to a motor (not shown) connected to the throttle valve to move the throttle valve to this position. In an alternative implementation, it is contemplated that the throttle input device 89 could be mechanically linked to the throttle valve of the throttle body 86 such that movement of the throttle input device 89 moves the throttle valve via a mechanical connection. A throttle valve position sensor (not shown) senses a position of the throttle valve of the throttle body 86 and sends a signal representative of this position to the engine controller 75. The engine controller 75 uses this signal from the throttle valve position sensor to determine if the throttle valve is in the desired position.

Figure 7:
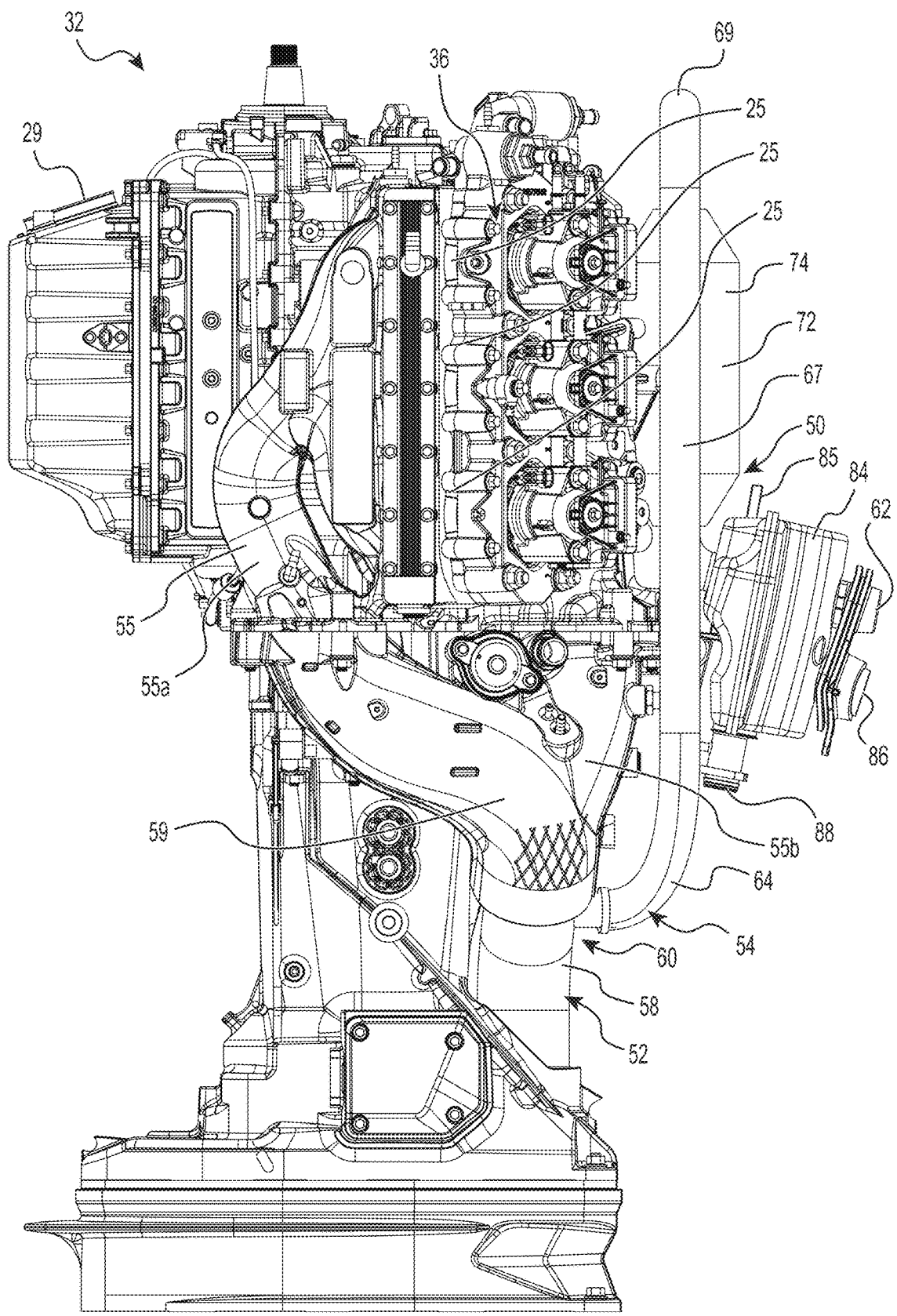
FIG. 7 is a left side elevation view of the portion of the outboard engine of FIG. 5.

As best shown in FIG. 7, the engine 36 is connected to an exhaust system 50 through which exhaust gases from the engine 36 are expelled. The exhaust system 50 has an exhaust manifold 55 that includes two exhaust manifold passages 55a, 55b connected to the two banks of cylinders 25 to receive exhaust gases from the engine exhaust ports (not shown) of the engine 36. The exhaust manifold 55 also has an exhaust collector 59 connected to the two exhaust manifold passages 55a, 55b and defining an exhaust port 57 through which the engine 36 expels exhaust gas. As will be described in detail below, in addition to the exhaust manifold passages 55a, 55b and the exhaust collector 59, the exhaust system 50 has a number of other components that are fluidly connected to the exhaust port 57 and control the flow of exhaust gas out of the outboard engine 10.

With reference to FIGS. 5 to 12, the exhaust system 50 also includes a first passage 52 and a second passage 54 intersecting the first passage 52. As will be described further below, the first and second passages 52, 54 route exhaust gas, in a controlled manner, from the exhaust port 57 out of the outboard engine 10.

The first passage 52 is fluidly connected between the exhaust port 57 and a lower exhaust port 56 (FIG. 2) from which exhaust gas can be expelled out of the outboard engine 10 via the propulsion unit 40 and the propeller 20. Notably, the first passage 52 includes a conduit 58 that is fluidly connected to the exhaust port 57.

The second passage 54 is connected to the first passage 52 at a junction 60 therebetween. The second passage 54 is fluidly connected between the first passage 52 and an upper exhaust port 62 from which exhaust gas can be expelled outwardly of the outboard engine 10. The second passage 54 includes a conduit 64 that connects to a side of the conduit 58 of the first passage 52 to receive exhaust gas from the first passage 52 into the second passage 54. More specifically, an opening in the side of the conduit 58 opens into the conduit 64 such that exhaust gas flows into the conduit 64 from the conduit 58. In this implementation, the conduit 64 and the conduit 58 are tubular, with the conduit 58 having a diameter that is greater than a diameter of the conduit 64. Nevertheless, a diameter of the conduit 64 may be relatively large. For instance, a ratio of the diameter of the conduit 64 over the diameter of the conduit 58 may be between 0.5 and 0.7. This relatively large size of the conduit 64 may increase flow to a catalytic converter 72 which will be described in more detail below.

Figure 14:
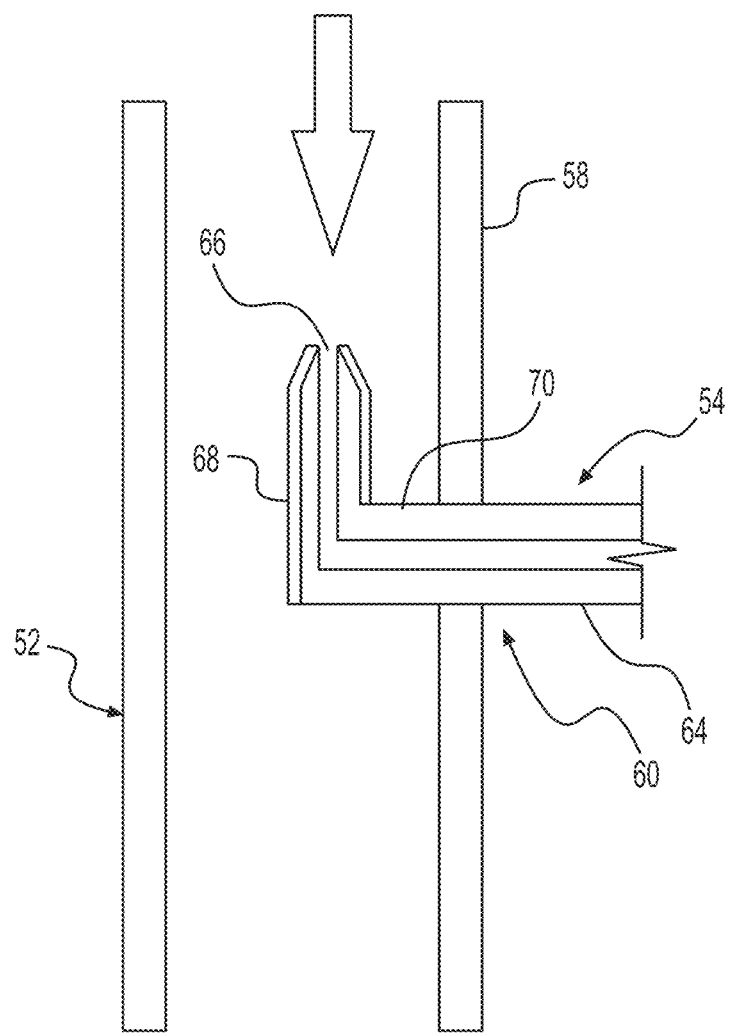
FIG. 14 is a cross-sectional view of an alternative implementation of the junction between the first and second passages of the exhaust system of the outboard engine of FIG. 2.

In an alternative implementation, with reference to FIG. 14, the conduit 64 of the second passage 54 has an inlet 66 that opens inside the conduit 58 of the first passage 52 for receiving incoming exhaust gas into the conduit 64. An end leg 68 of the conduit 64 extends from the inlet 66 in a direction along which at least part of the conduit 58 of the first passage 52 extends. That is, the end leg 68 of the conduit 64 extends in a same direction as the conduit 58 of the first passage 52 at the junction 60 between the first and second passages 52, 54. As such, the inlet 66 of the conduit 64 faces the direction along which the conduit 58 of the first passage 52 extends. A connecting leg 70 of the conduit 64 of the second passage 54 extends transversally, generally perpendicularly, from the end leg 68 through a side of the conduit 58 of the first passage 52. In other words, the connecting leg 70 extends in a direction generally perpendicular to the direction of the conduit 58 of the first passage 52 at the junction 60 between the first and second passages 52, 54. This alternative configuration of the conduit 64 of the second passage 54 may help minimize disruption to the flow of exhaust gas past the inlet 66 of the second passage 54 and thereby reduce disruption of the flow of exhaust gas and the back pressure associated therewith. In addition, this may help maintain equal pressure in the first and second passages 52, 54 in order to achieve isokinetic flow in the first and second passages 52, 54.

Returning to FIG. 2, it can be seen that the upper exhaust port 62 is positioned vertically higher than the lower exhaust port 56. More specifically, the lower and upper exhaust ports 56, 62 are positioned such that, during operation of the outboard engine 10, the upper exhaust port 62 is above water and the lower exhaust port 56 is below water (as shown by water level WL depicted in phantom lines in FIG. 2). The lower exhaust port 56 is defined in the propulsion unit 40. In particular, the lower exhaust port 56 is defined in the propeller 20 of the propulsion unit 40 and oriented such that exhaust gas expelled from the lower exhaust port 56 is directed rearwardly of the propeller 20 (and thus the watercraft 100).

Figure 5:
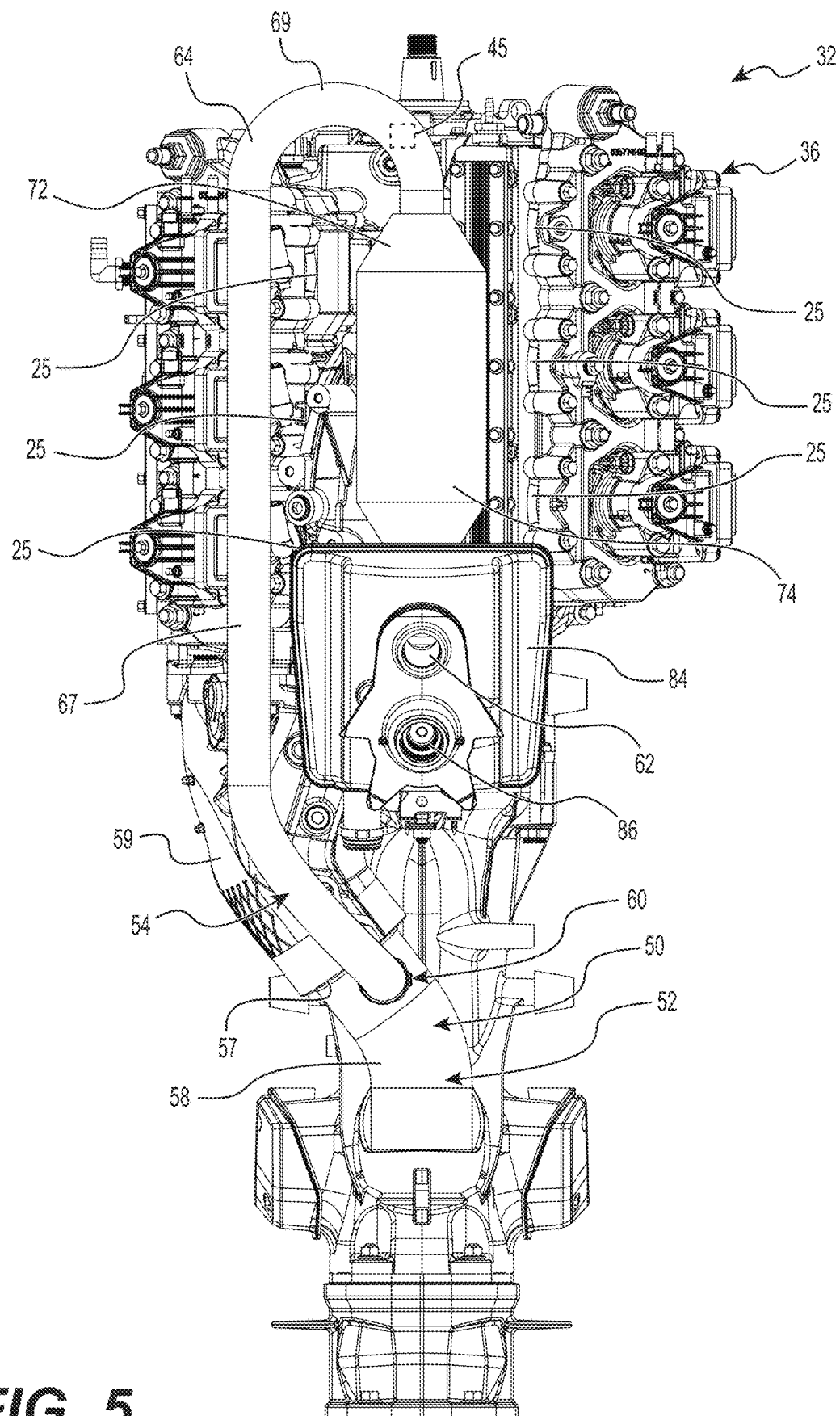
FIG. 5 is a rear elevation view of a portion of the outboard engine of FIG. 2 with a cowling thereof removed to expose the underlying components.
Figure 6:
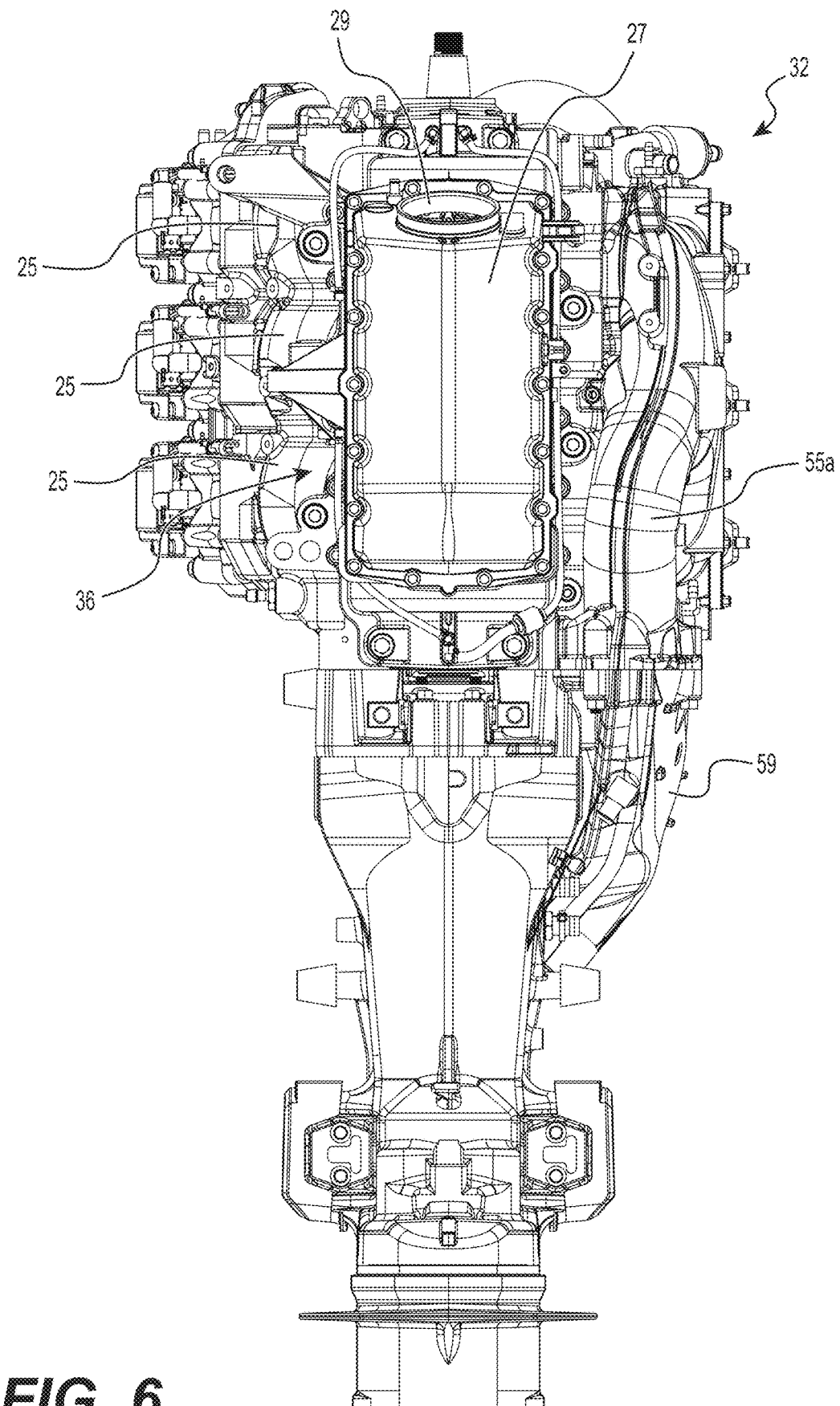
FIG. 6 is a front elevation view of the portion of the outboard engine of FIG. 5.

With reference to FIG. 5, the conduit 64 of the second passage 54 extends from the junction 60 to a catalytic converter 72 of the exhaust system 50. The catalytic converter 72 defines in part the second passage 54 such that exhaust gas circulating through the second passage 54 passes through the catalytic converter 72 before being expelled via the upper exhaust port 62. The conduit 64 includes a generally vertical portion 67 extending upwardly from the junction 60 and a gooseneck portion 69 fluidly connected between the generally vertical portion 67 and the catalytic converter 72.

Figure 8:
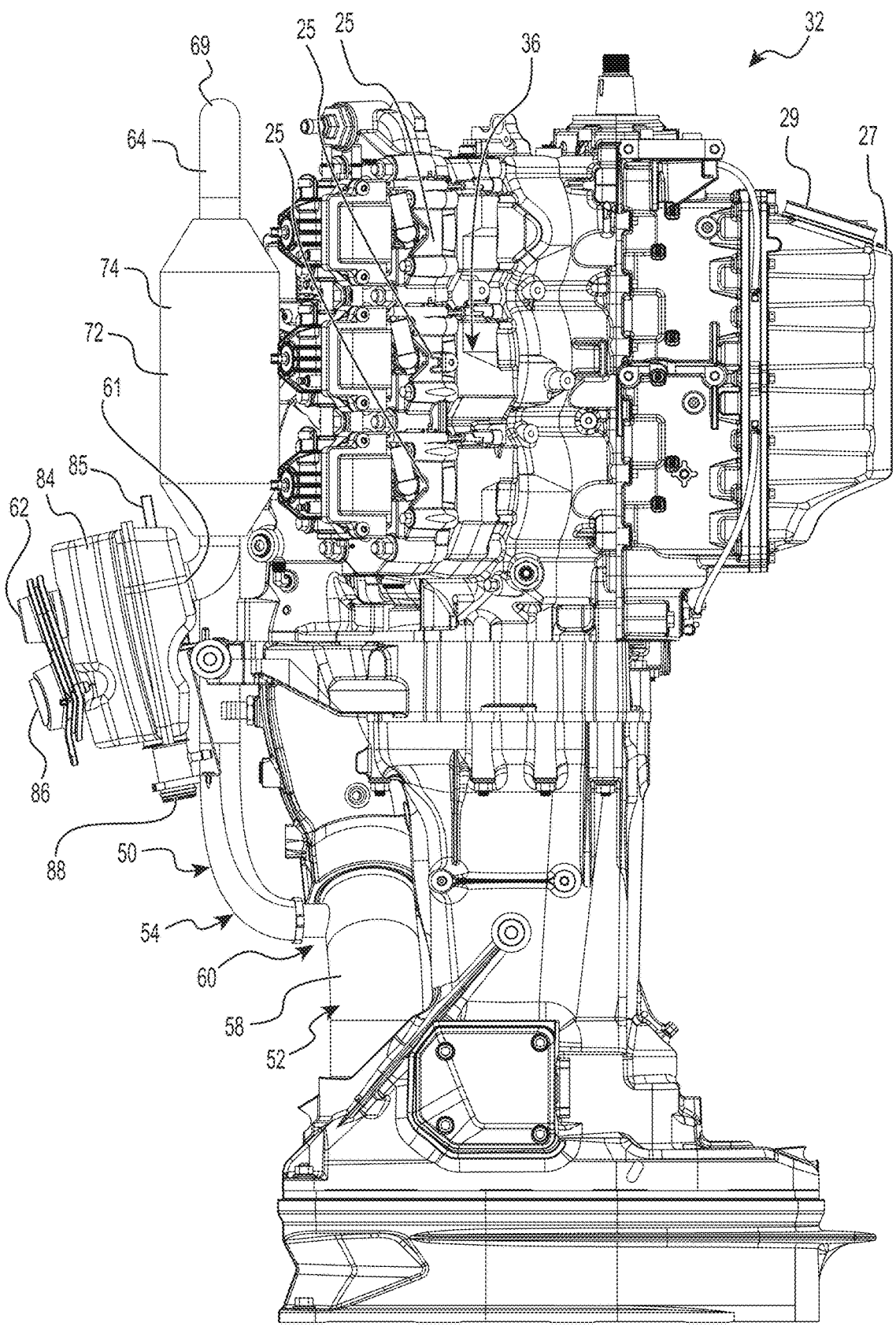
FIG. 8 is a right side elevation view of the portion of the outboard engine of FIG. 5.
Figure 10:
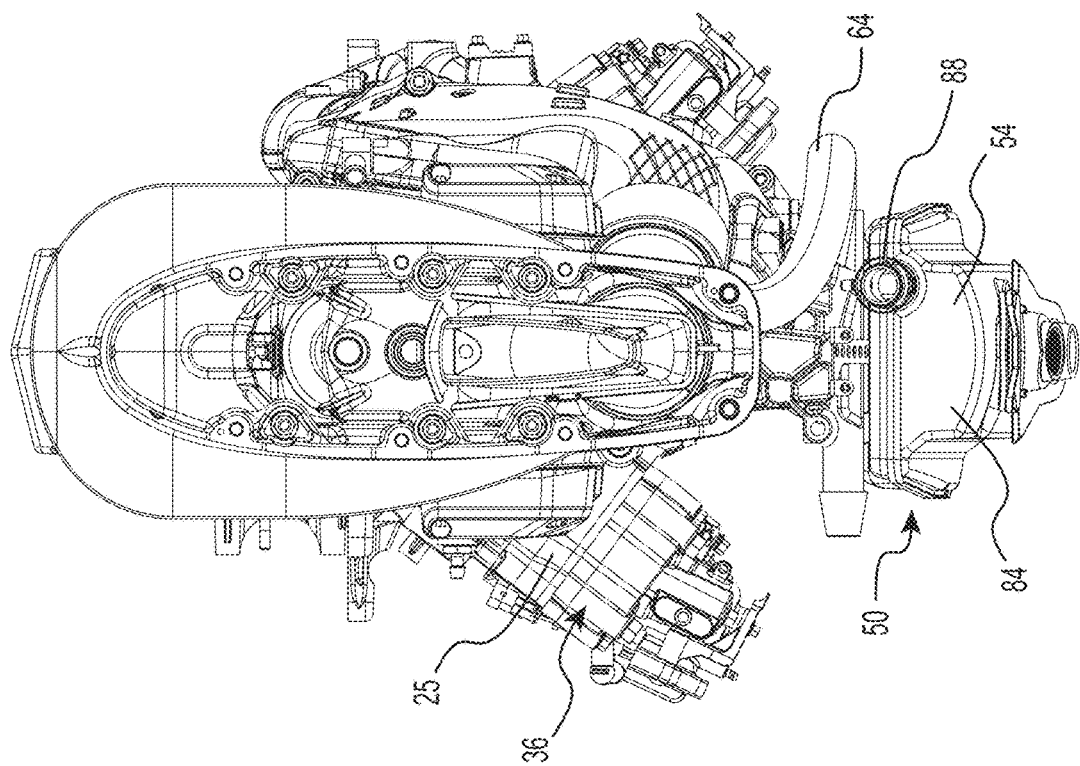
FIG. 10 is a bottom plan view of the portion of the outboard engine of FIG. 5.
Figure 15:
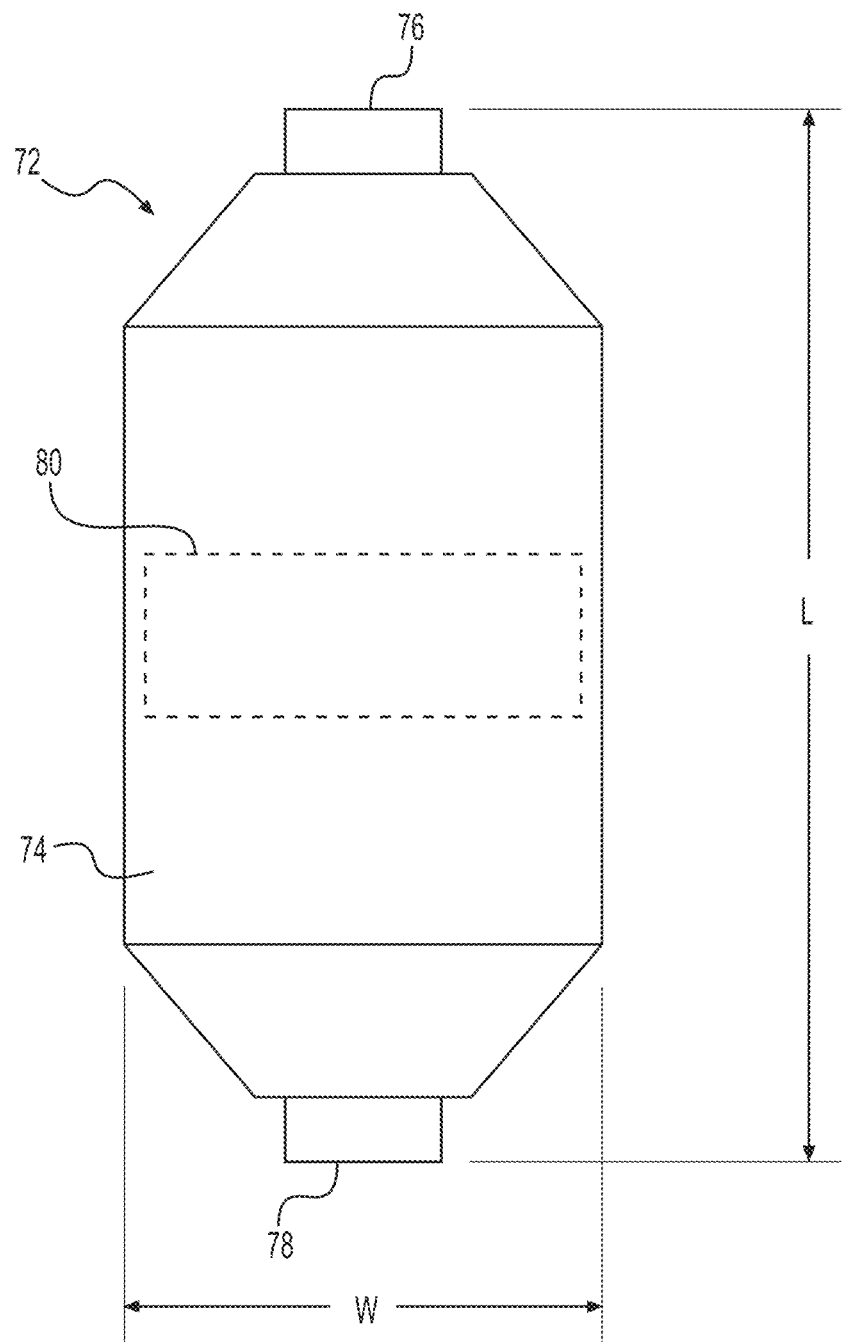
FIG. 15 is a rear elevation view of a catalytic converter of the exhaust system of the outboard engine of FIG. 2.

The catalytic converter 72 is configured for converting some polluting compounds contained in exhaust gases expelled by the engine 36 to less polluting compounds. As best shown in FIG. 15, the catalytic converter 72 has a casing 74 defining an inlet 76 and an outlet 78 and includes a catalyst substrate 80 contained within the casing 74 (schematically shown in FIG. 15). The catalyst substrate 80 includes a reduction catalyst and/or an oxidation catalyst made of a catalyst material such as palladium and/or any other suitable catalyst material (e.g., platinum, rhodium). As shown in FIGS. 5, 7 and 8, the catalytic converter 72 is located vertically higher than the first passage 52. As can be seen in FIG. 15, the catalytic converter 72 has a length L measured from the inlet 76 to the outlet 78 and a width W measured between opposite lateral sides of the casing 74. As will be explained in more detail below, the configuration of the exhaust system 50 may allow the catalytic converter 72 to be relatively small.

Figure 17:
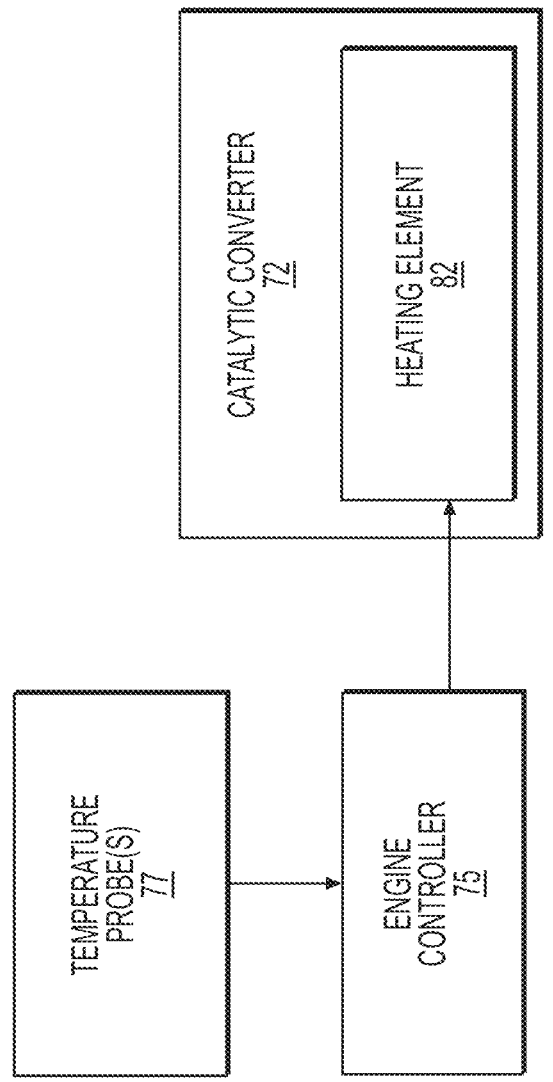
FIG. 17 is a schematic diagram of a control relationship between the controller of FIG. 3 and the catalytic converter in accordance with an implementation in which the catalytic converter is a heated catalytic converter.

As the catalytic converter 72 is most efficient above a temperature threshold, it is contemplated that, in some implementations, the catalytic converter 72 could be a heated catalytic converter. In such implementations, as shown in FIG. 17, the catalytic converter 72 has a heating element 82 (also schematically shown in FIG. 11) that is controlled to heat the catalytic converter 72. The heating element 82 is embedded within the casing 74 of the catalytic converter 72 to heat the catalyst substrate 80. In this example, control of the heating element 82 is assumed by the engine controller 75 which monitors the temperature of the catalytic converter 72 via one or more temperature probes 77 (schematically shown in FIG. 11) installed in the second passage 54 adjacent the catalytic converter 72. The heated catalytic converter 72 could be configured differently in other implementations.

Figure 9:
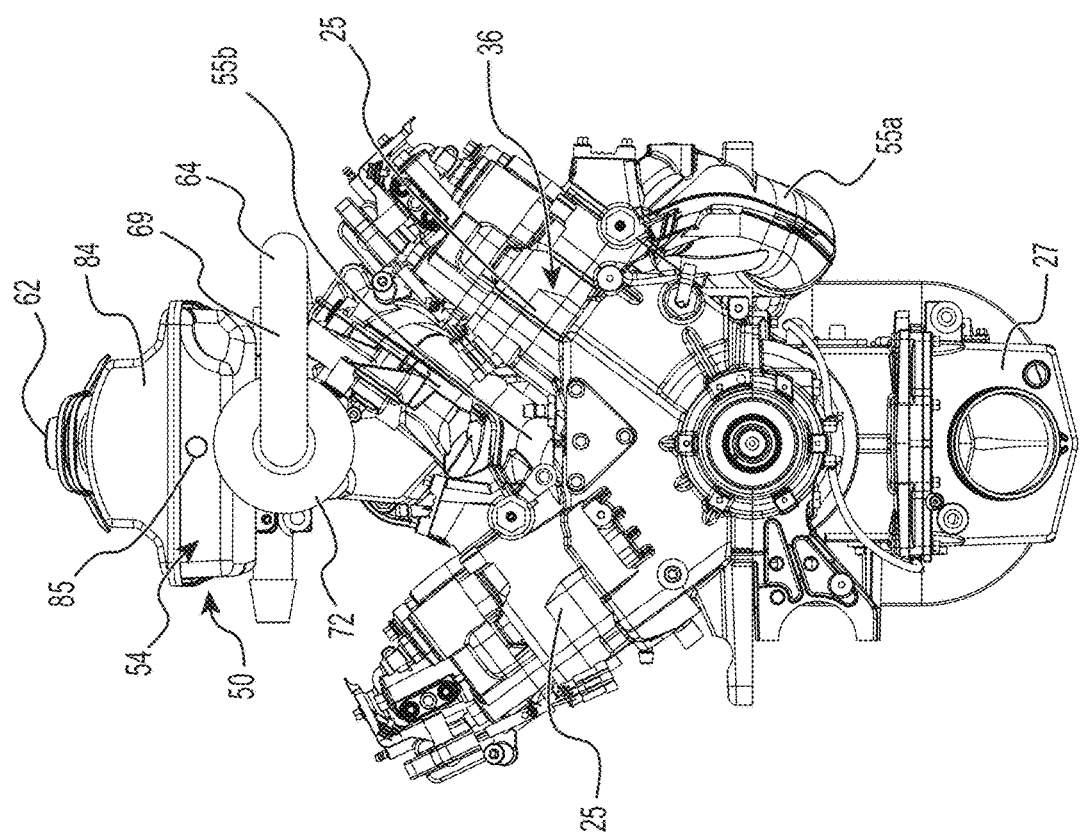
FIG. 9 is a top plan view of the portion of the outboard engine of FIG. 5.
Figure 11:
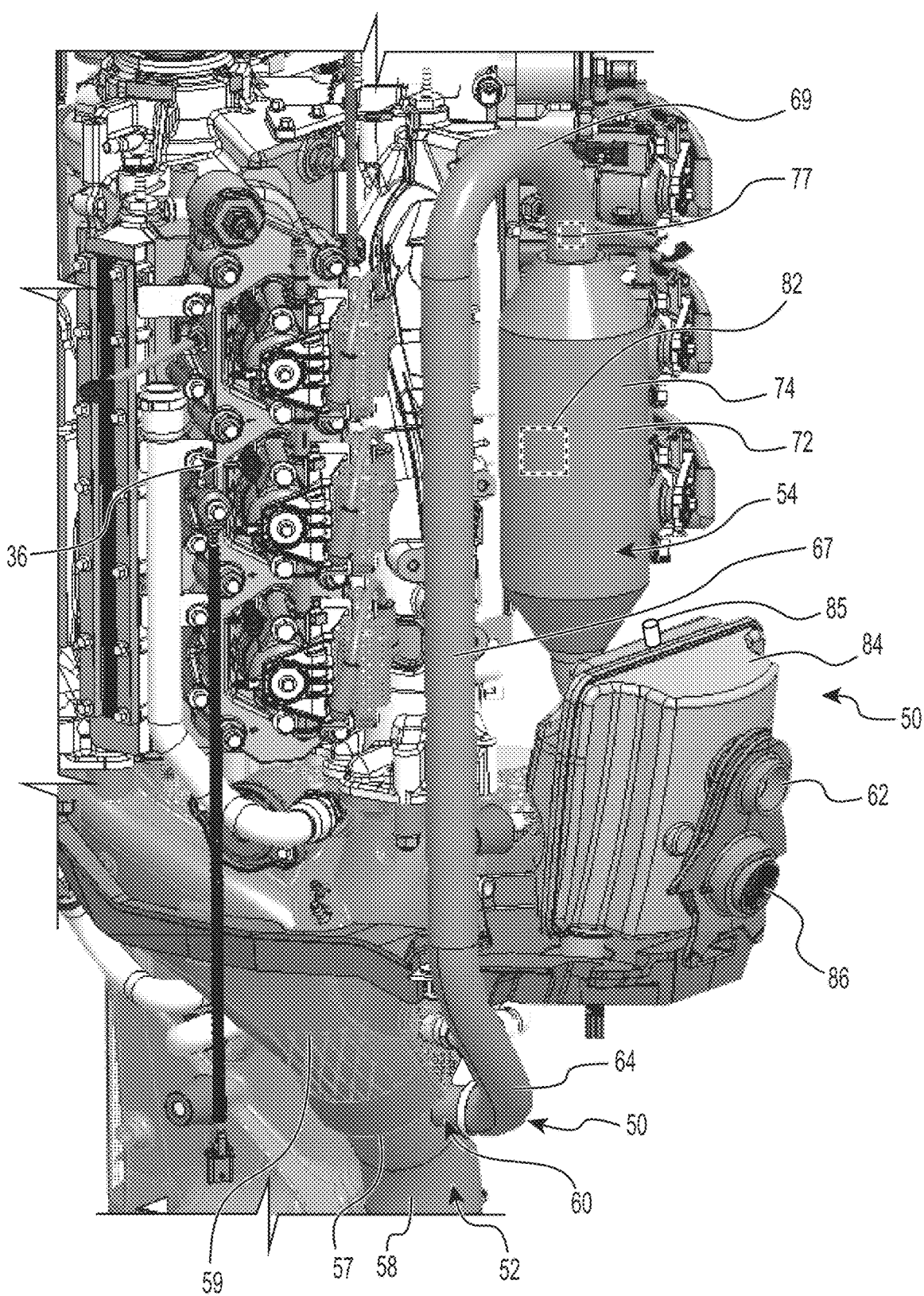
FIG. 11 is a left side perspective view of the portion of the outboard engine of FIG. 5.

A muffler 84 also defines in part the second passage 54 of the exhaust system 50. More particularly, the muffler 84 is fluidly connected between the catalytic converter 72 and the upper exhaust port 62 such that exhaust gas expelled from the catalytic converter 72 passes through the muffler 84 before being expelled through the upper exhaust port 62. In particular, in this implementation, the muffler 84 defines an exhaust inlet 61 (FIG. 8) through which the muffler 84 receives exhaust gas and the upper exhaust port 62 through which the muffler 84 expels exhaust gas. As best shown in FIGS. 7 and 8, a majority of the catalytic converter 72 is disposed vertically higher than the muffler 84. Furthermore, as shown in FIGS. 7 to 9, in this implementation, the muffler 84 has a water inlet 85 for receiving water within the muffler 84 and a water outlet 88 for expelling water from the muffler 84. The muffler 84 also has an outlet 86 for expelling water circulated through other components of the outboard engine 10 for cooling thereof. The water received in the muffler 84 cools exhaust gases flowing through the muffler 84 before being expelled from the muffler 84.

Figure 13:
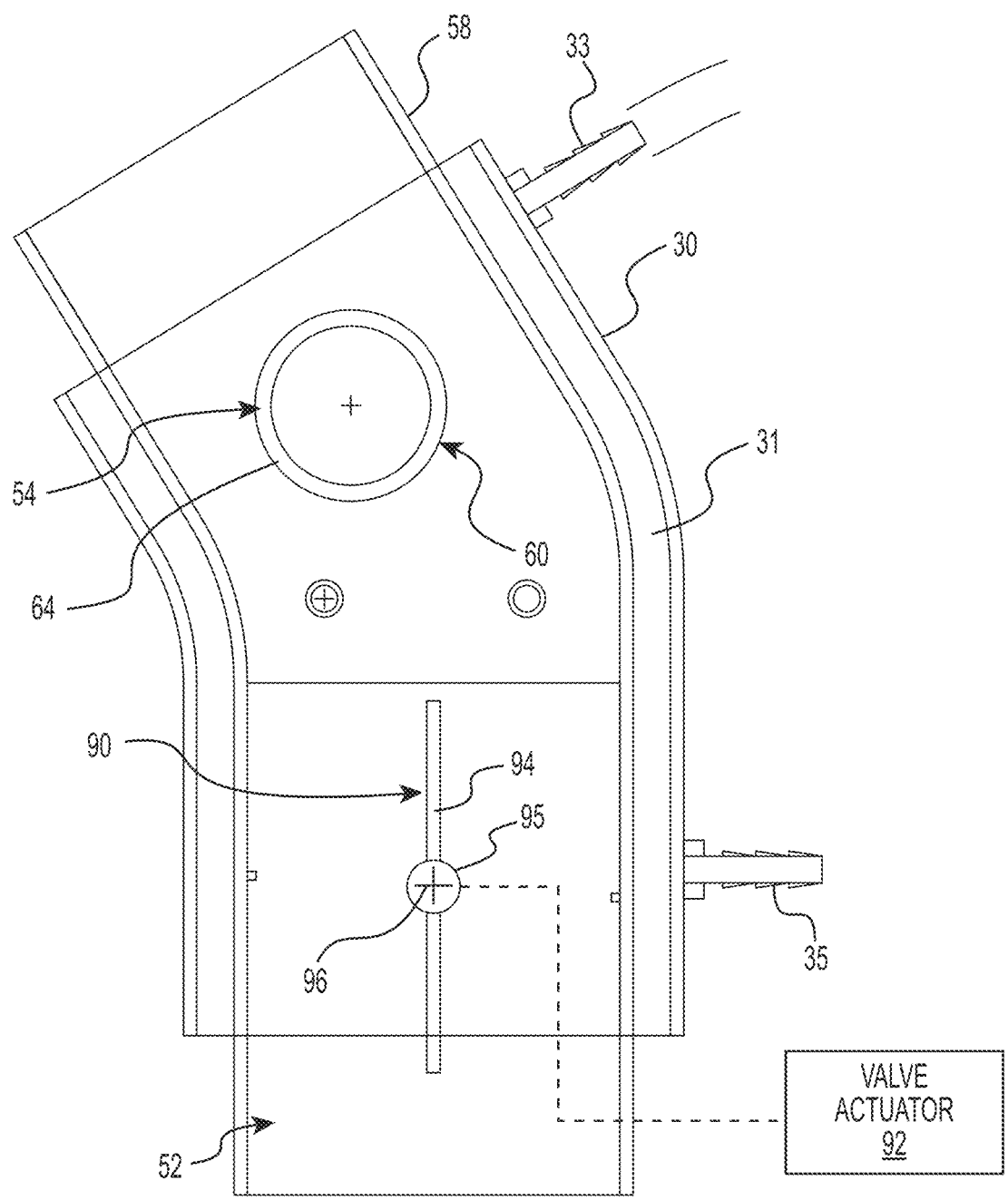
FIG. 13 is a cross-sectional view of part of the exhaust system at a junction between first and second passages of the exhaust system of the outboard engine of FIG. 2 showing the exhaust path valve.

With reference to FIG. 13, an exhaust path valve 90 is disposed in the first passage 52 downstream of the junction 60 between the first and second passages 52, 54. The exhaust path valve 90 is operable to at least partially close (i.e., block) the first passage 52 such as to reduce flow of exhaust gas to the lower exhaust port 56 and increase flow of exhaust gas to the upper exhaust port 62 under certain conditions. In this implementation, the exhaust path valve 90 is a butterfly valve including a disk 94 that rotates, together with an axle 95, about an axis 96 transverse to the direction of exhaust gas flow within the first passage 52 at a location of the exhaust path valve 90. The exhaust path valve 90 may be any other suitable type of valve in alternative implementations. The exhaust path valve 90 is located vertically between the lower and upper exhaust ports 56, 62. More particularly, the exhaust path valve 90 is located vertically lower than the engine 36.

An exhaust valve actuator 92 is operatively connected to the exhaust path valve 90 for actuating the exhaust path valve 90. In this implementation, the exhaust valve actuator 92 includes a motor (not shown) operatively connected to the axle 95 to cause rotation of the exhaust path valve 90. Such actuators for actuating a butterfly valve are well known and will thus not be described further here. As will be elaborated in more detail below, the engine controller 75 controls a position of the exhaust path valve 90, through the exhaust valve actuator 92, based on engine parameters that are monitored by the engine controller 75.

The exhaust system 50 also includes a cooling jacket 30 for cooling exhaust gas flowing in the exhaust system 50. More particularly, as shown in FIG. 13, in this implementation, the cooling jacket 30 partially surrounds the exhaust path valve 90 and the junction 60 between the first and second passages 52, 54. It is contemplated that the cooling jacket 30 could surround different parts of the first and second passages 52, 54 in alternative implementations (e.g., just the exhaust path valve 90 or just the junction 60). The cooling jacket 30 defines a space 31 between the cooling jacket 30 and the conduit 58 within which water is circulated to cool the exhaust gases flowing through the exhaust system 50. To that end, the cooling jacket 30 has a water inlet 33 for receiving water into the cooling jacket 30 and a water outlet 35 for expelling water from the cooling jacket 30. The cooling jacket 30 may be configured in any other suitable way in alternative implementations.

As mentioned above, the engine controller 75 controls the position of the exhaust path valve 90 based on engine parameters monitored by the engine controller 75. More specifically, in this implementation, the engine controller 75 controls the position of the exhaust path valve 90 based at least in part on a speed of the engine 36 and the throttle request represented by the position of the throttle input device 89 and read by the TIDPS 88. In this implementation, the position of the exhaust path valve 90 is controlled by the engine controller 75 through the exhaust valve actuator 92 to be either in a fully closed position in which the exhaust path valve 90 generally closes the first passage 52 or a fully open position (as seen in FIG. 13) in which the exhaust path valve 90 permits the most flow of exhaust gas within the first passage 52 past the exhaust path valve 90. When the exhaust path valve 90 is in its fully closed position, the flow of exhaust gas to the second passage 54 is maximized since the flow of exhaust gas in the first passage 52 is blocked, or mostly blocked, by the exhaust path valve 90.

Generally, at low speeds of the engine 36, the engine controller 75 is programmed to control the position of the exhaust path valve 90 to be in the fully closed position such that exhaust gas flow into the second passage 54 (and thus to the upper exhaust port 62) is maximized. In other words, when the engine 36 is under light load (e.g., at idle and low speed), exhaust gas flow into the second passage 54 is maximized. Conversely, at elevated speeds of the engine 36, the engine controller 75 is programmed to control the position of the exhaust path valve 90 to be in the fully open position such that exhaust gas flow to the lower exhaust port 58 is maximized. That is, when the engine 36 is under heavy load, exhaust gas flow to the lower exhaust port 58 is maximized. However, in order to avoid affecting the performance of the engine 36, during certain transitory states such as at elevated levels of throttle request of the engine 36 while at relatively low engine speed, the engine controller 75 is programmed to control the position of the exhaust path valve 90 to be in the fully open position.

Figure 16:
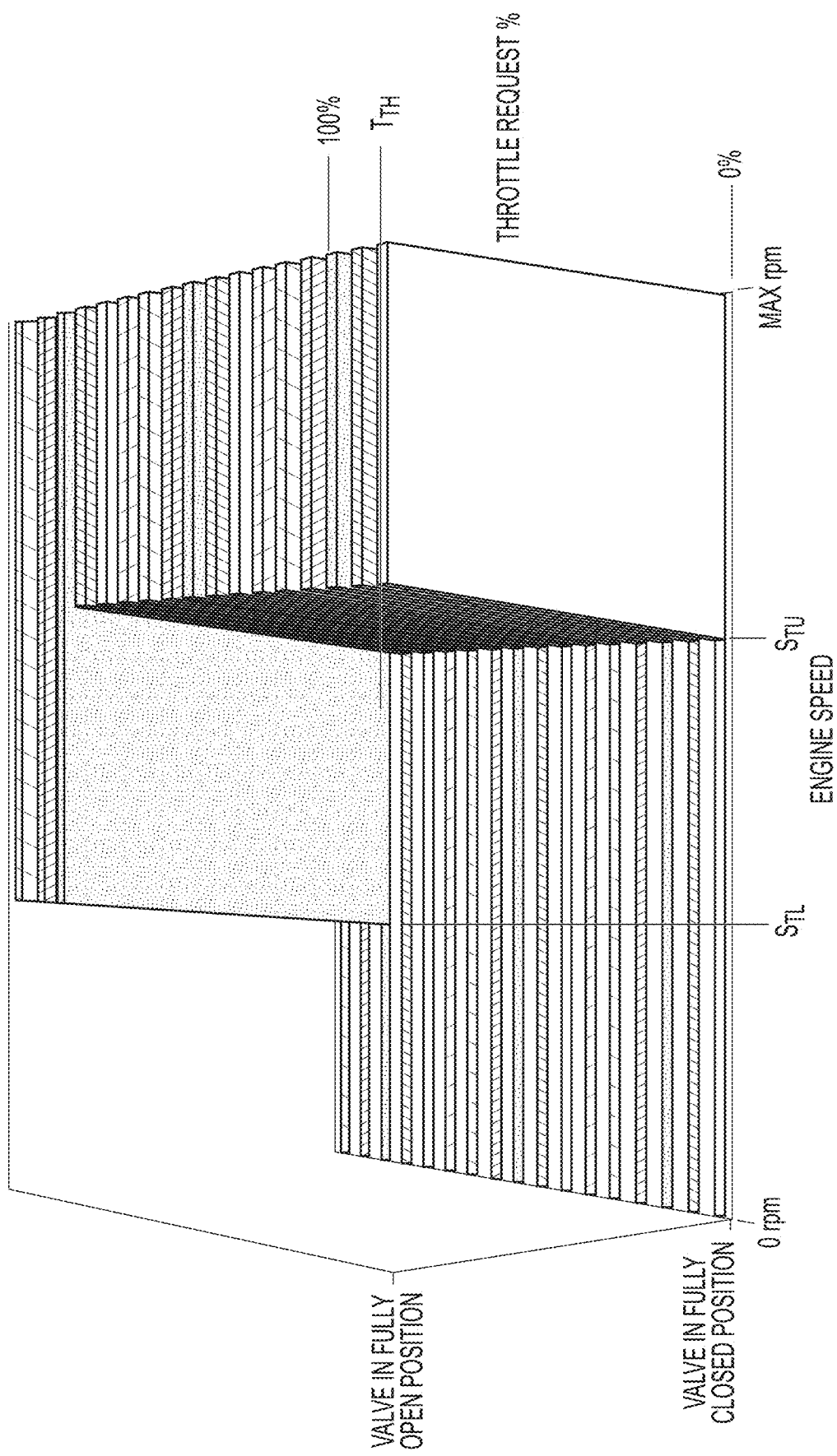
FIG. 16 is a graph illustrating the position of the exhaust path valve as a function of a speed of the engine and a throttle request of the engine.

To that end, with reference to FIG. 16, the engine controller 75 compares the speed of the engine 36 with an upper predetermined threshold engine speed $S_{TU}$ in order to determine if the exhaust path valve 90 is to be in the fully closed or fully open position. If the speed of the engine 36 is greater than the predetermined threshold engine speed $S_{TU}$, the engine controller 75 opens the exhaust path valve 90 (i.e., controls the exhaust path valve 90 to be in the fully open position). On the other hand, if the speed of the engine 36 is less than the predetermined threshold engine speed $S_{TU}$, the engine controller 75 proceeds to compare the throttle request of the engine 36 with a predetermined threshold throttle request $T_{TH}$ and the speed of the engine with a lower predetermined threshold engine speed $S_{TL}$ (that is less than the upper predetermined threshold engine speed $S_{TU}$). If the throttle request of the engine 36 is above (i.e., greater than) the predetermined threshold throttle request $T_{TH}$ and the speed of the engine is greater than the lower predetermined threshold engine speed $S_{TL}$, the engine controller 75 opens the exhaust path valve 90. However, if the throttle request of the engine 36 is below (i.e., less than) the predetermined treshold throttle request $T_{TH}$, or the speed of the engine is less than the lower predetermined threshold engine speed $S_{TL}$, the engine controller 75 closes the exhaust path valve 90 (i.e., controls the exhaust path valve 90 to be in the fully closed position).

In an alternative implementation, the engine controller 75 first compares the throttle request of the engine 36 with the predetermined threshold throttle request $T_{TH}$ in order to determine the value of the predetermined threshold engine speed on the basis of which the engine controller 75 controls the position of the exhaust path valve 90. More specifically, when the throttle request of the engine 36 is below (i.e., less than) the predetermined threshold throttle request $T_{TH}$, the predetermined threshold engine speed is the upper predetermined threshold engine speed $S_{TU}$. On the other hand, when the throttle request of the engine 36 is above (i.e., greater than) the predetermined threshold throttle request $T_{TH}$, the predetermined threshold engine speed is the lower predetermined threshold engine speed $S_{TL}$. The upper predetermined threshold engine speed $S_{TU}$ is greater than the lower predetermined threshold engine speed $S_{TL}$.

Once the predetermined threshold engine speed has been selected between the upper and lower predetermined threshold engine speeds $S_{TU}$, $S_{TL}$ on the basis of the throttle request of the engine 36 as set out above, the engine controller 75 closes the exhaust path valve 90 (i.e., controls the exhaust path valve 90 to be in the fully closed position) when the speed of engine 36 is below the selected one of the predetermined threshold engine speeds $S_{TU}$, $S_{TL}$ and opens the exhaust path valve 90 (i.e., controls the exhaust path valve 90 to be in the fully open position) when the speed of the engine 36 is greater than the selected one of the predetermined threshold engine speeds $S_{TU}$, $S_{TL}$.

It is noted that the second passage 54 remains open regardless of the position of the exhaust path valve 90. As such, a portion of exhaust gas flow enters the second passage 54 even when the exhaust path valve 90 is in its fully open position and the catalytic converter 72 is always treating at least a portion of the exhaust, regardless of the position of the exhaust path valve 90.

In this implementation, the predetermined threshold throttle request $T_{TH}$ is between 55% and 75%, inclusively, of the WOT of the engine 36. In other words, the predetermined threshold throttle request $T_{TH}$ corresponds to a position of the throttle input device 89 requesting between 55% and 75%, inclusively, of a maximum throttle request. The predetermined threshold throttle request $T_{TH}$ may have any other suitable value in alternative implementations. Furthermore, in this implementation, the upper predetermined threshold engine speed $S_{TU}$ is between 3000 and 4000 rpm while the lower predetermined threshold engine speed $S_{TL}$ is between 1000 rpm and 2000 rpm. The upper and lower predetermined threshold engine speeds $S_{TU}$, $S_{TL}$ may have any other suitable values in other implementations. The values associated with the upper and lower predetermined threshold engine speeds $S_{TU}$, $S_{TL}$ and the predetermined threshold throttle request $T_{TH}$ are stored in the memory 217 of the engine controller 75. These values may vary depending on the specific characteristic of the outboard engine 10.

This manner of controlling the flow of exhaust gas through the exhaust system 50 may allow the catalytic converter 72 to be relatively small since the catalytic converter 72 is under a significantly reduced load at high engine speeds and/or at high throttle request whereby a majority of the exhaust gas flows through the first passage 52 and bypasses the catalytic converter 72. In turn, this may reduce the cost of producing the catalytic converter 72. For instance, the length L of the catalytic converter 72 may be relatively small.

Furthermore, the exhaust system 50 expels a greater proportion of exhaust gas through the muffler 84 and its above-water upper exhaust port 62 compared to conventional exhaust systems of outboard engines. This may be helpful to provide a more consistent back pressure in the exhaust system 50 during full operation of the catalytic converter 72 (i.e., when the exhaust path valve 90 is in its fully closed position) as opposed to conventional exhaust systems which typically expel a majority of exhaust gas through the propeller (below water) and must thus account for the shape of the associated watercraft (which varies by model) when tuning the engine for back pressure.

It is noted that, under this control scheme, when the outboard engine 10 is run in reverse, the engine throttle request and the engine speed are typically low and thus a greater proportion of exhaust gas is made to flow through the second passage 54 and out through the upper exhaust port 62. This may avoid "ventilating" the propeller 20 which often occurs in conventional exhaust systems whereby when the engine is run in reverse, the exhaust gas is expelled through in front of the propeller and can reduce traction of the propeller 20 and thus negatively affect the outboard engine's performance.

In an alternative implementation, the position of the exhaust path valve 90 could be controlled with finer granularity such that the exhaust path valve 90 can be controlled to be in other positions in addition to the fully closed and fully open positions. In other words, in such an implementation, the engine controller 75 can control the position of the exhaust path valve 90 to be one of the fully closed position, the fully open position, and any of a plurality of intermediate positions between the fully closed and fully open positions. The engine controller 75 controls the position of the exhaust path valve 90 to these different intermediate positions based on the speed of the engine 36. Alternatively, or in addition, the engine controller 75 could control the position of the exhaust path valve 90 to the different intermediate positions based at least in part on a back pressure in the exhaust system 50. For instance, as shown schematically in FIG. 5, a pressure sensor 45 can be disposed in the second passage 54 (or alternatively in the first passage 52) upstream of the catalytic converter 72 (i.e., between the catalytic converter 72 and the engine exhaust port 57) to sense the back pressure in the exhaust system 50. Controlling the position of the exhaust path valve 90 based on the back pressure in the exhaust system 50 provides a substantially constant engine torque by the engine 36 and thus consistent engine operation.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. An exhaust system for a marine outboard engine including an engine, the engine including an engine exhaust port, the exhaust system comprising:

a first exhaust port;
a second exhaust port positioned vertically higher than the first exhaust port;
a first passage adapted for fluidly connecting to the engine exhaust port, the first passage being fluidly connected to the first exhaust port;
a second passage fluidly connected between the first passage and the second exhaust port;
a catalytic converter defining at least in part the second passage;
an exhaust path valve operable to at least partially close the first passage for reducing flow of exhaust gas to the first exhaust port and increasing flow of exhaust gas to the second exhaust port;
a valve actuator operatively connected to the exhaust path valve for actuating the exhaust path valve; and
a controller operatively connected to the valve actuator for controlling a position of the exhaust path valve based at least in part on a speed of the engine and a throttle request of the engine.

2. The exhaust system of claim 1, wherein:
the controller closes the exhaust path valve when the speed of the engine is below a predetermined threshold engine speed; and
the controller opens the exhaust path valve when the speed of the engine is greater than the predetermined threshold engine speed.

3. The exhaust system of claim 2, wherein:
below a predetermined throttle request, the predetermined threshold engine speed is a first predetermined threshold engine speed;
above the predetermined throttle request, the predetermined threshold engine speed is a second predetermined threshold engine speed; and
the first predetermined threshold engine speed is greater than the second predetermined threshold engine speed.

4. The exhaust system of claim 3, wherein the predetermined throttle request is between 55% and 75% of wide-open throttle (WOT) inclusively.

5. The exhaust system of claim 1, wherein the second passage remains open at all positions of the exhaust path valve.

6. The exhaust system of claim 1, wherein the controller controls the position of the exhaust path valve to be one of:
a fully closed position;
a fully open position; and
one of a plurality of positions between the fully closed and fully open positions.

7. The exhaust system of claim 1, further comprising a pressure sensor disposed in one of the first passage and the second passage upstream of the catalytic converter; and
wherein the controller further controls the position of the exhaust path valve based at least in part on a back pressure sensed by the pressure sensor.

8. The exhaust system of claim 7, wherein the controller controls the position of the exhaust path valve based at least in part on the back pressure for providing a substantially constant engine torque by the engine.

9. The exhaust system of claim 1, wherein the second passage is further defined by a muffler fluidly connected between the catalytic converter and the second exhaust port.

10. The exhaust system of claim 9, wherein at least a majority of the catalytic converter is disposed vertically higher than the muffler.

11. The exhaust system of claim 9, wherein the muffler has:
a water inlet for receiving water within the muffler to cool exhaust gases flowing through the muffler; and
a water outlet for expelling water from the muffler.

12. The exhaust system of claim 1, wherein:
the first passage includes a first conduit, at least part of the first conduit extending along a first direction;
the second passage includes a second conduit having:
an inlet opening inside the first conduit for receiving incoming exhaust gases into the second conduit;
a first leg extending from the inlet in the first direction; and
a second leg extending generally perpendicularly from the first leg through a side of the first conduit.

13. The exhaust system of claim 1, wherein the catalytic converter is located vertically higher than the first passage.

14. The exhaust system of claim 1, wherein the exhaust path valve is located downstream of a junction between the first passage and the second passage.

15. The exhaust system of claim 1, further comprising a cooling jacket at least partly surrounding the exhaust path valve and a junction between the first passage and the second passage, the cooling jacket comprising:
a water inlet for receiving water into the cooling jacket; and
a water outlet for expelling water from the cooling jacket.

16. The exhaust system of claim 1, wherein the catalytic converter is a heated catalytic converter.

17. The exhaust system of claim 1, wherein the exhaust path valve is vertically between the first and the second exhaust ports.

18. The exhaust system of claim 1, wherein:
the first exhaust port is positioned for being located below water during operation of the marine outboard engine; and
the second exhaust port is positioned for being located above water during operation of the marine outboard engine.

19. A marine outboard engine for a watercraft, comprising:
an engine having an engine exhaust port for expelling exhaust gas from the engine;
a propulsion unit driven by the engine;
a throttle body connected to the engine and including a throttle valve for controlling air supplied to the engine;
an engine controller controlling a position of the throttle valve in accordance with a throttle request; and
an exhaust system, comprising:
a first exhaust port;
a second exhaust port positioned vertically higher than the first exhaust port;
a first passage fluidly connected between the engine exhaust port and the first exhaust port;
a second passage fluidly connected between the first passage and the second exhaust port;
a catalytic converter fluidly defining at least in part the second passage;
an exhaust path valve operable to at least partially close the first passage for reducing flow of exhaust gas to the first exhaust port and increasing flow of exhaust gas to the second exhaust port; and
an exhaust path valve actuator operatively connected to the exhaust path valve for actuating the exhaust path valve, the engine controller being operatively connected to the exhaust valve actuator for controlling a position of the exhaust path valve based at least in part on a speed of the engine and the throttle request of the engine.

20. The marine outboard engine of claim 19, wherein the exhaust path valve is located vertically lower than the engine.

21. The marine outboard engine of claim 19, wherein the first exhaust port is defined in the propulsion unit of the marine outboard engine.

22. The marine outboard engine of claim 19, wherein:
the first exhaust port is positioned for being located below water during operation of the marine outboard engine; and
the second exhaust port is positioned for being located above water during operation of the marine outboard engine.

\* \* \* \* \*